J. A. HUNNEWELL.
ELECTRICALLY OPERATED WATER HEATER.
APPLICATION FILED APR. 4, 1908.
938,237.
Patented Oct. 26, 1909.
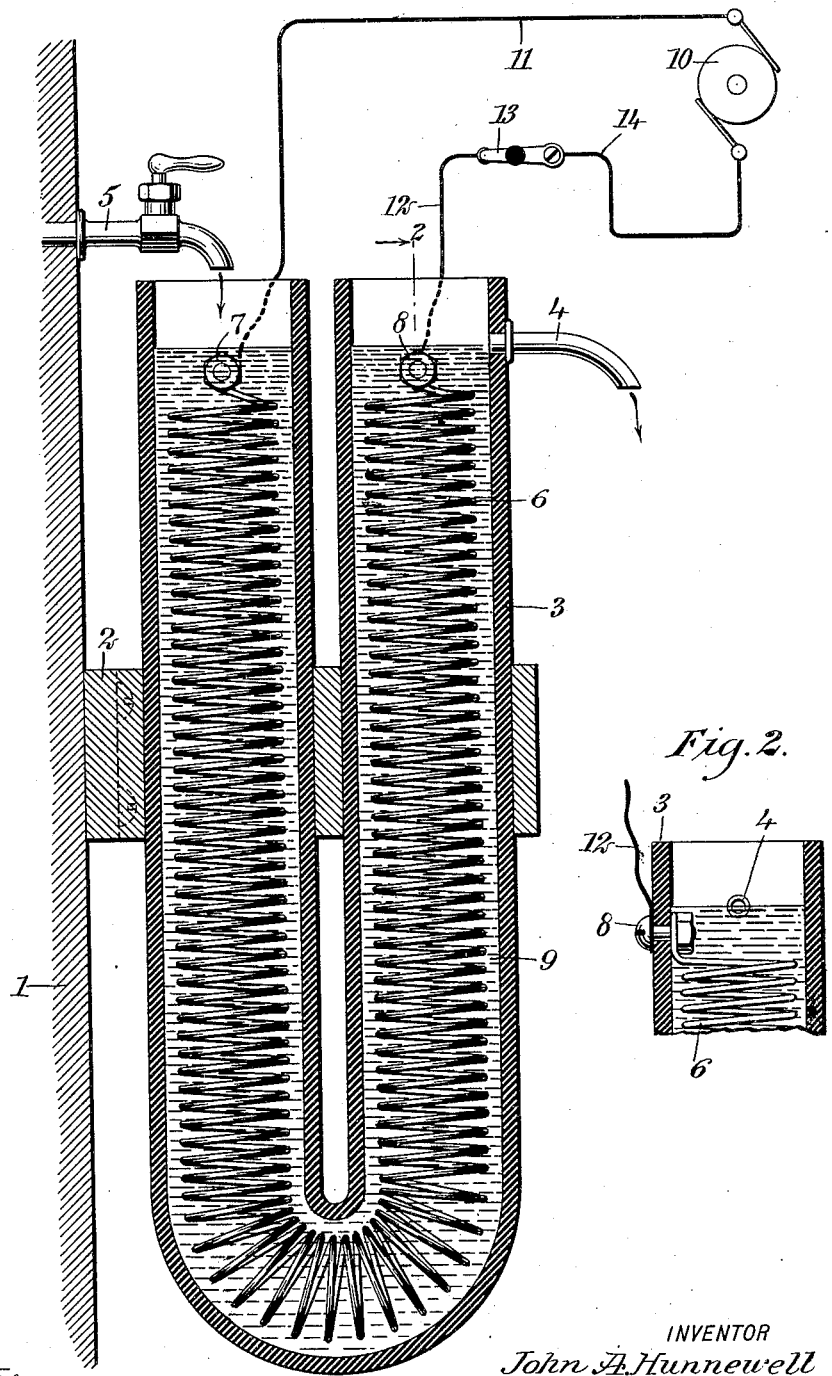
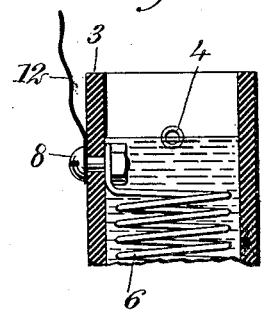
WITNESSES
Edward Thorpe.
Walton Harrison.
INVENTOR
John A. Hunnewell
BY Munn & Co
ATTORNEYS

UNITED STATES PATENT OFFICE.

JOHN ARTHUR HUNNEWELL, OF LOWELL, MASSACHUSETTS.

ELECTRICALLY-OPERATED WATER-HEATER.

938,237.

Specification of Letters Patent.  Patented Oct. 26, 1909.

Application filed April 4, 1908.  Serial No. 425,093.

*To all whom it may concern:*

Be it known that I, JOHN ARTHUR HUNNEWELL, a citizen of the United States, and a resident of Lowell, in the county of Middlesex and State of Massachusetts, have invented a new and Improved Electrically-Operated Water-Heater, of which the following is a full, clear, and exact description.

My invention relates to electrically-operated water heaters, my more particular purpose being to provide a type of said heater containing a minimum of parts, the latter being so arranged that water passes through a long tube containing a heating coil, the cold water entering at one end of this tube and the hot water being drawn from the opposite end of the same.

Reference is to be had to the accompanying drawings forming a part of this specification, in which similar characters of reference indicate corresponding parts in both the views.

Figure 1 is a view partly in section and partly diagrammatic, showing the heating coil and the circuit for connecting it with a source of electricity; and Fig. 2 is a fragmentary section upon the line 2 of Fig. 1, looking in the direction of the arrow, and showing one of the binding posts used as a terminal for the heating coil, this view further showing the educt through which water is discharged.

Mounted upon a wall 1 is a bracket 2, and supported within this bracket is a U-shaped tube 3 formed of insulating material. The U-tube is provided with an educt 4 through which the hot water is discharged. A faucet 5 is employed for discharging cold water into the U-tube. A heating coil 6 is secured at its ends by terminals 7, 8 disposed below the water line and is wound spirally so as to loosely fill the tube practically from one of its ends to the other.

At 9 is shown the water to be heated.

A dynamo 10 is connected by a wire 11 with the terminal 7, and connected with the terminal 8 is a wire 12 leading to a switch 13, connected with a wire 14.

The heating coil 6 is made of bare wire, preferably German silver, and is entirely submerged, no part of it extending above the upper level of the water.

The operation of my device is as follows: Normally the switch 13 is open so that no current flows. The switch 13 being closed, however, the current is turned on and traverses the heating coil, and raises the temperature of the water contained in the U-tube. If, now, any water is to be drawn out of the tube, the operator merely opens the faucet 5, thereby allowing cold water to flow in, and the water in the tube seeks its level and hot water must pass out through the educt 4. The circuit is as follows: dynamo 10, wire 11, terminal 7, heating coil 6, terminal 8, wire 12, switch 13, wire 14, thence back to dynamo 10.

Having thus described my invention, I claim as new and desire to secure by Letters Patent,—

1. A device of the class described, comprising a substantially U-shaped tube, an outlet below the other end, a spirally wound wire arranged within the tube whose loops are concentric with the tube, and arranged in close proximity to each other and spaced apart from the tube walls, terminals in the tube to which the ends of the wire are connected, and an electric circuit connected with the terminals.

2. A device of the class described comprising an approximately U-shaped tube open at one end to receive water from a supply and having at its other end a discharge means and both ends of the tube being opened to permit the water to level itself in the two branches of the tube and a resistance coil disposed in the two branches of the tube and connected at the juncture thereof and terminals with which the ends of the resistance coil are connected, substantially set forth.

3. An electrical water heater comprising an approximately U-shaped tube having the two branches united at one end and open at their other ends whereby water may be delivered directly into one of said ends and whereby water will level in the two branches of the tube, the tube being made of insulated material, a resistance coil within the tube and extending longitudinally within the branches thereof, terminals in the sides of the tube and to which the resistance coil is connected at its ends, and means for supporting the tube independent of the water supply whereby it may be applied for use in connection with an ordinary faucet, substantially as set forth.

In testimony whereof I have signed my name to this specification in the presence of two subscribing witnesses.

JOHN ARTHUR HUNNEWELL.

Witnesses:
 FRANCIS W. QUA,
 STANLEY E. QUA.